United States Patent
Itabashi

(10) Patent No.: US 7,075,563 B2
(45) Date of Patent: Jul. 11, 2006

(54) MULTI-BEAM LASER SCANNING DEVICE

(75) Inventor: Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/448,413

(22) Filed: May 30, 2003

(65) Prior Publication Data

US 2004/0032483 A1   Feb. 19, 2004

(30) Foreign Application Priority Data

Jun. 4, 2002   (JP)  ............................. 2002-162468

(51) Int. Cl.
  *B41J 27/00*   (2006.01)
(52) U.S. Cl. ..................... 347/243; 347/259
(58) Field of Classification Search ................ 347/131, 347/240, 241–244, 256–261, 233, 234, 248; 329/204; 359/204–206, 208, 216
See application file for complete search history.

(56) References Cited

U.S. PATENT DOCUMENTS

| | | | | |
|---|---|---|---|---|
| 4,393,387 | A * | 7/1983 | Kitamura | 347/240 |
| 5,128,699 | A * | 7/1992 | Nakajima et al. | 347/131 |
| 5,136,418 | A | 8/1992 | Itabashi | 359/218 |
| 5,221,986 | A | 6/1993 | Itabashi | 359/206 |
| 5,383,754 | A | 1/1995 | Sumida et al. | 412/11 |
| 5,426,298 | A | 6/1995 | Sakuma et al. | 250/235 |
| 5,475,522 | A | 12/1995 | Itabashi et al. | 359/208 |
| 5,504,613 | A | 4/1996 | Itabashi et al. | 359/210 |
| 5,648,864 | A | 7/1997 | Itabashi | 359/205 |
| 5,914,800 | A * | 6/1999 | Akatsu | 359/206 |
| 6,049,408 | A * | 4/2000 | Tada | 359/204 |
| 6,376,837 | B1 | 4/2002 | Itabashi et al. | 250/234 |
| 6,381,057 | B1 | 4/2002 | Itabashi | 359/204 |
| 6,429,956 | B1 | 8/2002 | Itabashi | 359/204 |
| 6,469,772 | B1 | 10/2002 | Itabashi | 355/47 |
| RE38,195 | E * | 7/2003 | Sakai et al. | 359/204 |
| 6,596,985 | B1 | 7/2003 | Sakai et al. | 250/234 |

(Continued)

FOREIGN PATENT DOCUMENTS

JP   2000-241730   9/2000

(Continued)

OTHER PUBLICATIONS

U.S. Appl. No. 09/946,482, filed Sep. 6, 2001, Ohashi et al, U.S. Pat. 6,747,818.

(Continued)

*Primary Examiner*—Hai Pham
(74) *Attorney, Agent, or Firm*—Oblon, Spivak, McClelland, Maier & Neustadt, P.C.

(57) ABSTRACT

There is provided a multi-beam laser scanning device able to efficiently suppress and prevent density fluctuation and achieve higher image quality. The multi-beam laser scanning device comprises a light emitting source generating a plurality of laser beams, a rotating deflector that has a plurality of deflecting surfaces. On a scanning surface, an interval between a scanning line X generated by deflection of a first deflecting surface of the deflector and a scanning line Y generated by deflection of a second deflecting surface of the deflector and adjacent to the scanning ling X satisfies at least one of the following two equations:

$$\Delta P' < 0.8 \cdot Ps$$

$$\Delta P' < 0.6 \cdot Ws$$

where $\Delta P'$ represents the difference between a maximum interval and a minimum interval between the scanning line X and the scanning line Y, Ps represents an object value of two neighboring scanning lines, and Ws represents the size of a light spot in the sub-scan direction.

8 Claims, 7 Drawing Sheets

U.S. PATENT DOCUMENTS

2002/0101665 A1    8/2002    Ohashi et al.

FOREIGN PATENT DOCUMENTS

JP    2001-13433    1/2001

OTHER PUBLICATIONS

U.S. Appl. No. 09/715,151, filed Nov. 20, 2000, Itabashi, U.S. Pat. 6,700,687.

U.S. Appl. No. 09/769,510, filed Jan. 26, 2001, Nakajima et al., (Pending).

U.S. Appl. No. 09/810,184, filed Mar. 19, 2001, Itabashi, U.S. Pat. 6,624,920.

U.S. Appl. No. 09/827,097, filed Apr. 6, 2001, Ono et al., (Pending).

U.S. Appl. No. 09/873,256, filed Jun. 5, 2001, Ema et al., (Pending).

U.S. Appl. No. 10/102,633, filed Mar. 22, 2002, Ameyama et al., U.S. Pat. 6,707,480.

U.S. Appl. No. 10/183,748, filed Jun. 28, 2002, Nihei et al., (Pending).

U.S. Appl. No. 10/247,702, filed Sep. 20, 2002, Hayashi et al., (Pending).

U.S. Appl. No. 10/319,624, filed Dec. 16, 2002, Ono et al., (Pending).

U.S. Appl. No. 10/448,413, filed Mar. 30, 2003, Itabashi, (Pending).

U.S. Appl. No. 10/448,413, filed May. 30, 2003, Itabashi.

U.S. Appl. No. 10/840,369, filed May 7, 2004, Itabashi et al.

\* cited by examiner $\Delta P = P_{max} - P_{min}$

| Ps | n | Ws | ΔP | ΔP' | EVALUATION |
|---|---|---|---|---|---|
| 63.5 μm (400dpi) | 2 | 80 μm | ±20 μm | 40 μm | ○ |
| | 2 | 80 μm | ±25 μm | 50 μm | △ |
| 42.3 μm (600dpi) | 4 | 60 μm | ±15 μm | 30 μm | ○ |
| | 4 | 60 μm | ±20 μm | 40 μm | × |

MULTI-BEAM LASER SCANNING DEVICE

BACKGROUND OF THE INVENTION

1. Field of the Invention

The present invention relates to a writing optical system in a laser printer, a copy machine, or a laser PPF (Plain Paper Fax), specifically, relates to a multi-beam scanning device that uses a plurality of laser beams for scanning at the same time to obtain high image quality at a high speed.

2. Description of the Related Art

In a laser scanning device of a laser printer, a copy machine, or a laser PPF, it is well-known that a high speed and a high density image can be achieved by using a writing optical system of a laser scanning device in which a plurality of laser beams are made to scan the surface of a medium at the same time. This is the so-called multi-beam scanning technique.

Japanese Unexamined Patent Publications No. 2001-13433 and No. 2000-241730 have disclosed techniques for improving the image quality when such a multi-beam scanning device is employed.

In Japanese Unexamined Patent Publications No. 2001-13433, it is disclosed that the emitting directions of a number of laser beams from a number of light emitting sources are all inclined by the same angle, thereby the laser beams have the same shapes of scanning line bending, and as a result, the fluctuation of scanning line intervals in the sub-scanning direction is reduced, furthermore the density fluctuation can be suppressed to a low level.

However, in the technique disclosed in Japanese Unexamined Patent Publication No. 2001-13433, only the influence of the emission angles of laser beams is considered by placing a limitation on the emission angles, but the influences of other factors are not considered at all, for example, the beam diameter, desired scanning line intervals, and fluctuation of the scanning line intervals are not considered.

On the other hand, in Japanese Unexamined Patent Publication No. 2000-241730, it is disclosed that light transmitting members are arranged in the light path, and by moving the light transmitting members, positions of the laser beams in the sub-scanning direction are corrected.

Turning to the problem to be solved by the present invention, when using a multi-beam writing optical system that uses a plurality of laser beams for scanning, it is different from scanning with a single laser beam in the aspect that in the sub-scanning direction, the laser beams pass through positions deviating from the optical axis of the scanning optical system, which includes, for example, an fθ lens. This situation is explained below in detail with reference to FIG. 2. When such a laser beam deviating from the optical axis of the scanning optical system is directed to scan a medium, for example, a photoconductor, there arises a problem in that the scanning line of the laser beam on the scanning surface of the medium is not straight, but is bent; this is called the "scanning line bending" phenomenon. The amount of scanning line bending increases when the deviation of the laser beam from the optical axis of the scanning optical system becomes large. In other words, in a multi-beam writing optical system, among the number of laser beams that scan the medium at the same time, the more peripheral laser beams, that is, the laser beams farther from the optical axis of the lenses, have greater scanning line bending.

Due to the scanning line bending, the scanning line intervals, that is, the distance between two adjacent scanning lines, in the sub-scan direction, are not uniform. As described later with reference to FIG. 4, near centers of scanning lines, the scanning line intervals are small; at positions other than the centers and ends of scanning lines, the intervals are large.

Because of the fluctuation of the scanning line intervals, the pixel density in an image fluctuates, too. In particular, the scanning line interval is quite large near the centers of two neighboring scanning lines formed by laser beams deflected by two successive deflection reflection surfaces. This interval is roughly twice that of scanning lines of laser beams deflected by the same deflection reflection surface. So, in this region, the density fluctuation in an image is more noticeable.

SUMMARY OF THE INVENTION

Accordingly, it is a general object of the present invention to solve the above problem of the related art by providing a multi-beam laser scanning device and an image forming apparatus able to efficiently suppress and prevent density fluctuation and achieve higher image quality.

A first specific object of the present invention is to provide a multi-beam laser scanning device able to appropriately set a scanning line interval so as to suppress density fluctuation to an acceptable range.

A second specific object of the present invention is to provide a multi-beam laser scanning device of a simple configuration able to adjust scanning line intervals to suppress density fluctuation.

A third specific object of the present invention is to provide a multi-beam laser scanning device of a simple configuration able to adjust emission directions of laser beams from a light emitting source to suppress density fluctuation.

A fourth specific object of the present invention is to provide a multi-beam laser scanning device of a simple configuration able to increase pixel density while suppressing density fluctuation.

To attain the above objects, according to a first aspect of the present invention, there is provided a multi-beam laser scanning device comprising a light emitting source that generates a plurality of laser beams, a rotating deflector that has a plurality of deflecting surfaces, the rotating deflector, while rotating, deflecting the laser beams at each of the deflecting surfaces to make the laser beams scan in a first direction, and a scanning surface on which a plurality of light spots of the laser beams deflected by the rotating deflector are formed along a second direction, each of the light spots moving in the first direction and forming a plurality of scanning lines, wherein a plurality of scanning lines generated by deflection of a first deflecting surface of the deflecting surfaces are located along the second direction next to the scanning lines generated by deflection of a second deflecting surface next to the first deflecting surface, and an interval between a scanning line X that is generated by deflection of the first deflecting surface and a scanning line Y that is generated by deflection of the second deflecting surface and is adjacent to the scanning line X satisfies at least one of the following two equations:

$$\Delta P' < 0.8 \cdot Ps \tag{1}$$

$$\Delta P' < 0.6 \cdot Ws \tag{2}$$

where $\Delta P'$ represents the difference between a maximum interval and a minimum interval between the scanning line X and the scanning line Y, Ps represents a target interval of two neighboring scanning lines among the scanning lines generated by deflection of the first deflecting surface or the second deflecting surface, which is determined by a target density of the scanning lines in the second direction, and Ws represents the size of one of the light spots in the second direction.

Preferably, in the above multi-beam laser scanning device, the light emitting source comprises a semiconductor laser array including a plurality of laser units, and the laser units are arranged to be inclined relative to a normal line to a scanning plane formed by the laser beams deflected by the rotating deflector.

Preferably, in the above multi-beam laser scanning device, the light emitting source comprises a semiconductor laser array including a plurality of laser units, and the light emitting source as a whole is arranged to be rotatable with respect to a rotational axis parallel to the laser emission direction of the light emitting source.

Preferably, in the above multi-beam laser scanning device, the light emitting source comprises a semiconductor laser array including a plurality of laser units, and the semiconductor laser array is arranged to be rotatable with respect to a rotational axis parallel to the laser emission direction of the light emitting source.

Preferably, in the above multi-beam laser scanning device, the light emitting source further comprises a rotation adjustment unit configured to adjust the rotation of the light emitting source with respect to a rotational axis parallel to the scanning plane formed by the laser beams deflected by the rotating deflector.

Preferably, in the above multi-beam laser scanning device, the light emitting source comprises a plurality of semiconductor laser arrays each including a plurality of laser units, and light spots on the scanning surface formed by different laser units of different semiconductor laser arrays are alternately arranged.

Preferably, in the above multi-beam laser scanning device, the light emitting source comprises a plurality of semiconductor laser arrays each including a plurality of laser units, and light spots on the scanning surface formed by the laser units of different semiconductor laser arrays are alternately arranged. Preferably, light spots on the scanning surface formed by the laser units of each semiconductor laser array are arranged along a straight line.

According to the above aspect of the-present invention, when at least one of equations (1) and (2) is satisfied, appropriate superposition of neighboring light spots on the scanning surface can be obtained, and density fluctuation caused by the scanning line bending can be effectively prevented or suppressed to an acceptable range so as not to be visible to users, and hence higher image quality is achievable. Consequently, it is possible to provide a multi-beam laser scanning device able to appropriately adjust the scanning line interval to suppress density fluctuation.

According to the above invention, it is possible to provide a multi-beam laser scanning device having a simple configuration but able to adjust the scanning line interval, the emission directions of laser beams from the light emitting source to suppress density fluctuation, and increase the pixel density.

Specifically, by scanning a number of laser beams at the same time, it is possible to reduce the number of revolutions of the rotating deflector, thereby reducing the power consumption for driving the deflector to rotate, and further reducing heat generation and noise due to the rotational movement as well.

In addition, by setting the light spot size in the second direction (the sub-scan direction) to an appropriate range relative to an object value of the scanning line interval, it is possible to suppress the density fluctuation in an image to an acceptable range. Furthermore, it is possible to increase the pixel density in the sub-scan direction without changing the configuration of the existing optical system.

In addition, the scanning line interval can be freely changed by adjusting the inclination of the arrangement of the laser units, for example, the scanning line interval can be adjusted to the object value, so as to suppress the scanning line fluctuation to the minimum.

In addition, the incident angle of laser beams can be corrected, thereby it is possible to suppress the scanning line bending, as well as the fluctuation of the scanning line interval.

When the light emitting source is configured to include a plurality of semiconductor laser arrays, it is possible to further increase image formation speed and pixel density without changing the deflecting speed of the deflector.

To attain the above object, according to a second aspect of the present invention, there is provided a multi-beam laser scanning device, comprising a light emitting source that generates a plurality of laser beams, a rotating deflector that has a plurality of deflecting surfaces, the rotating deflector, while rotating, deflecting the laser beams at each of the deflecting surfaces to make the laser beams scan in a first direction, and a scanning surface on which a plurality of light spots of the laser beams deflected by one of the deflecting surfaces are formed in a line along a second direction, each of the light spots moving in the first direction and forming a plurality of scanning lines, wherein an interval between two neighboring scanning lines of the scanning lines satisfies at least one of the following two equations:

$$\Delta P < 0.8 \cdot Ps/(n-1) \qquad (3)$$

$$\Delta P < 0.6 \cdot Ws/(n-1) \qquad (4)$$

where $\Delta P$ represents the difference between a maximum interval and a minimum interval between the two neighboring scanning lines, Ps represents a target interval of two neighboring scanning lines, which is determined by a target density of the scanning lines in the second direction, Ws represents the size of one of the light spots in the second direction, and n represents the number of the scanning lines generated by deflection of one of the deflecting surfaces.

According to the above invention, when at least one of equations (3) and (4) is satisfied, appropriate superposition of neighboring light spots on the scanning surface can be obtained, therefore density fluctuation can be limited to an acceptable range.

To attain the above object, according to a third aspect of the present invention, there is provided a multi-beam laser scanning device, comprising a light emitting source that generates a plurality of laser beams, a rotating deflector that has a plurality of deflecting surfaces, the rotating deflector, while rotating, deflecting the laser beams at each of the deflecting surfaces to make the laser beams scan in a first direction, and a scanning surface on which a plurality of light spots of the laser beams deflected by the rotating deflector are formed along a second direction, each of the light spots moving in the first direction and forming a plurality of scanning lines, wherein a target interval between two neighboring scanning lines among the scanning lines satisfies the following equation:

$$Ps < 0.75 \cdot Ws \qquad (5)$$

where Ps represents a target interval of two neighboring scanning lines related to a target density of the scanning lines in the second direction, and Ws represents the size of one of the light spots in the second direction.

According to the above invention, when equation (5) is satisfied, appropriate superposition of neighboring light dots on the scanning surface can be obtained, therefore density fluctuation can be limited to an acceptable range.

To attain the above object, according to a third aspect of the present invention, there is provided an image forming apparatus, comprising a light emitting source that generates a plurality of laser beams, a rotating deflector that has a plurality of deflecting surfaces, the rotating deflector, while rotating, deflecting the laser beams at each of the deflecting surfaces to make the laser beams scan in a first direction, and a photoconductor having a scanning surface on which a plurality of light spots of the laser beams deflected by the rotating deflector are formed along a second direction, each of the light spots moving in the first direction and forming a plurality of scanning lines, wherein a plurality of scanning lines generated by deflection of a first deflecting surface of the deflecting surfaces are located along the second direction next to the scanning lines generated by deflection of a second deflecting surface next to the first deflecting surface, and an interval between a scanning line X that is generated by deflection of the first deflecting surface and a scanning line Y that is generated by deflection of the second deflecting surface and is adjacent to the scanning ling X satisfies at least one of the following two equations:

$$\Delta P' < 0.8 \cdot Ps$$

$$\Delta P' < 0.6 \cdot Ws$$

where $\Delta P'$ represents the difference between a maximum interval and a minimum interval between the scanning line X and the scanning line Y, Ps represents a target interval of two neighboring scanning lines among the scanning lines generated by deflection of the first deflecting surface or the second deflecting surface, which is determined by a target density of the scanning lines in the second direction, and Ws represents the size of one of the light spots in the second direction.

According to the above invention, when at least one of equations (1) and (2) is satisfied, appropriate superposition of neighboring light spots on the scanning surface can be obtained, and density fluctuation caused by the scanning line bending can be effectively prevented or suppressed to an acceptable range so as not to be visible to users, and hence higher image quality is achievable. Consequently, it is possible to provide a multi-beam laser scanning device able to appropriately adjust the scanning line interval to suppress density fluctuation.

According to the above aspect of the present invention, it is possible to provide an image forming apparatus having a simple configuration but able to adjust the scanning line interval, the emission directions of laser beams from the light emitting source to suppress density fluctuation, and increase the pixel density.

By scanning a number of laser beams at the same time, it is possible to reduce the number of revolutions of the rotating deflector, thereby reducing the power consumption for driving the deflector to rotate, and heat generation and noise due to the rotational movement as well.

By setting the light spot size in the second direction (the sub-scan direction) to an appropriate range relative to an object value of the scanning line interval, it is possible to suppress the density fluctuation in an image to an acceptable range. Furthermore, it is possible to increase the pixel density in the sub-scan direction without changing the configuration of the existing optical system.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention will be explained with reference to the accompanying drawings.

The First Embodiment

Figure 1:
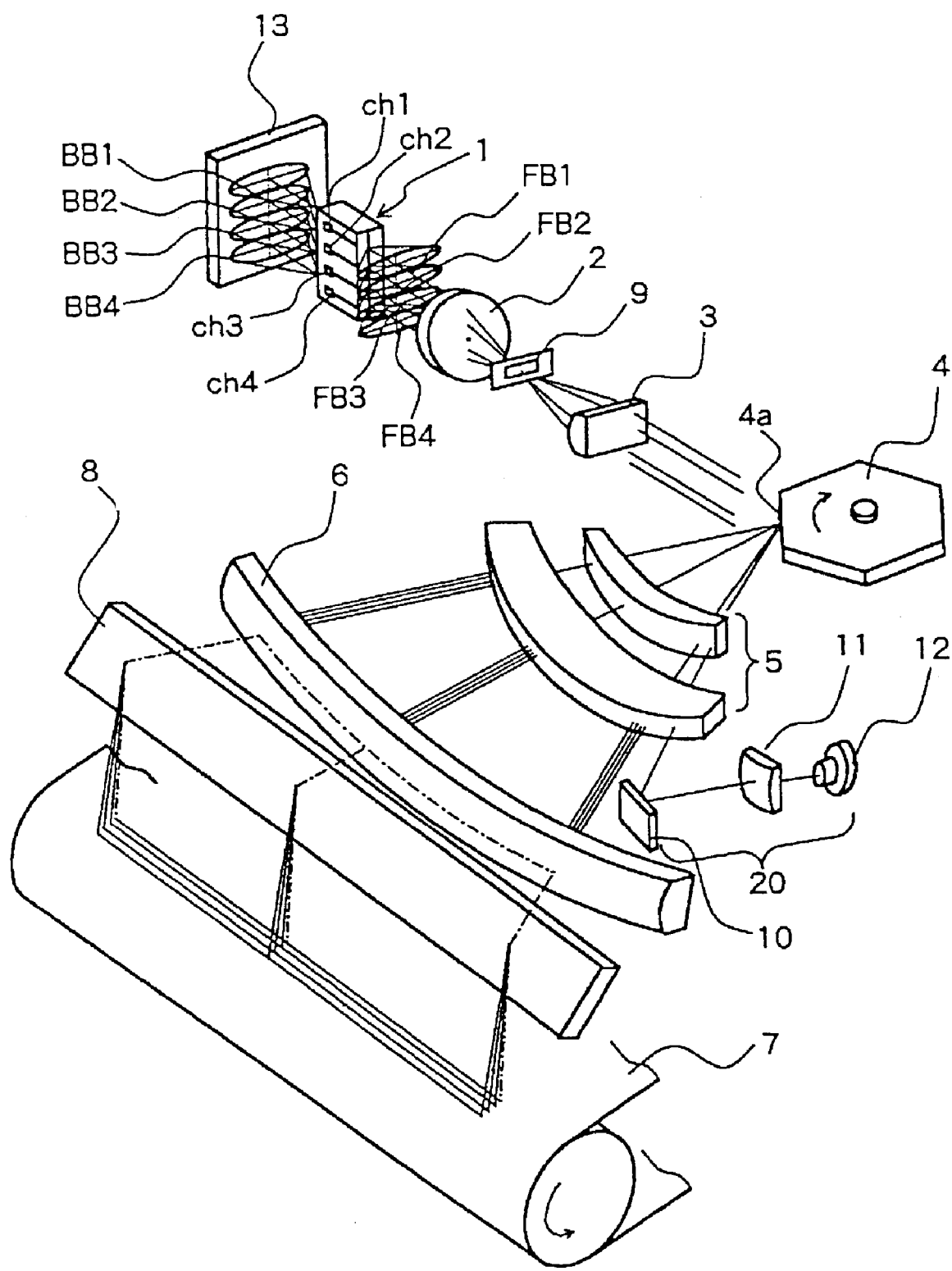
FIG. 1 is a perspective view for schematically showing a configuration of a principal portion of a multi-beam laser scanning device according to a first embodiment of the present invention.

FIG. 1 is a perspective view for schematically showing an overall configuration of the scanning optical system of the multi-beam laser scanning device according to the first embodiment of the present invention.

The scanning optical system of the multi-beam laser scanning device shown in FIG. 1 is comprised of a light emitting source 1, a condensing lens 2, a line-image formation optical system 3, a deflector 4, an fθ lens 5, a long sheet lens 6, a medium 7 that is scanned by the laser beams, a mirror 8, a lens diaphragm 9, a mirror 10, an image formation element 11, a synchronization detection sensor 12, and a photo diode 13. The mirror 10, the image formation element 11, and the synchronization detection sensor 12 form a synchronization detection system 20.

In the scanning optical system shown in FIG. 1, the light emitting source 1 includes a plurality of light emitting units to emit a plurality of laser beams. The condensing lens 2 condenses the divergent laser beams from the light emitting units. The deflector 4 reflects and deflects the incident laser beams to make the laser beams scan in the main-scanning direction. The line-image formation optical system 3 is refractive in the sub-scanning direction; it focuses the laser beams condensed by the condensing lens 2 and forms approximately line-shaped images near the deflection and reflection plane 4a of the deflector 4. The fθ lens 5 and the long sheet lens 6 (and the mirror 8 as well) direct the laser beams reflected and deflected by the deflector 4 and form laser spots on the scanning surface of the medium 7.

The light emitting source 1, for example, is formed from a semiconductor laser chip having a number of laser units corresponding to the light emitting units, and emits a plurality of divergent laser beams.

After the laser beams emitted from the light emitting source 1 pass the condenser lens 2, the laser beams are defined by the lens diaphragm 9. Then the line image formation optical system 3 focuses the defined laser beams and forms line-shaped images near the deflection and reflection plane 4a of the deflector 4.

The deflector 4, for example, is formed from a polygon mirror able to be rotated when being driven, and deflects the incident laser beams at a constant angular speed.

The fθ lens 5 and the long sheet lens 6 are arranged between the deflector 4 and the medium 7; the combined system of the fθ lens 5 and the long sheet lens 6 forms laser spots on the scanning surface of the medium 7 via the mirror 8. Due to the rotation of the deflector 4, these laser spots move on the scanning surface of the medium 7.

The synchronization detection system 20, as described above, includes the mirror 10, the image formation element 11, and the synchronization detection sensor 12. The image formation element 11 directs the laser beams reflected and deflected by the mirror 10 to the synchronization detection sensor 12. The image formation element 11 may be formed by lenses refractive only in the sub-scanning direction (that is, having refractive power only in the sub-scanning direction), or lenses refractive only in the main-scanning direction, or lenses refractive in both the sub-scanning direction and the main-scanning direction. In addition, instead of lenses, the image formation element 11 may also be formed by a mirror having refractive power, for example, a curved mirror. Further, the synchronization detection system 20 may also be configured with a mirror 10 having the functions of the image formation element 11. In this case, the image formation element 11 is not needed, and the laser beams are directed to the synchronization detection sensor 12 by the mirror 10.

In the scanning optical system shown in FIG. 1, as a specific example of the light emitting source 1 comprising a semiconductor laser chip having a number of laser units, the light emitting source 1 is formed by a laser diode array (LDA), further, for example, the light emitting source 1 has four laser units, that is, a laser diode array including four laser diodes. Because of the structure of the semiconductor laser chip shown in FIG. 1, the light emitting source 1 emits laser beams in both the forward direction and the backward direction relative to the chip.

Here, the "forward direction" is defined as the direction from the light emitting source 1 to the deflector 4, and the laser beams emitted in the forward direction are indicated by FB1 through FB4 in FIG. 1. The "backward direction" is opposite to the forward direction, and the laser beams emitted in the backward direction are indicated by BB1 through BB4 in FIG. 1. The laser beams emitted in the backward direction (BB1 through BB4) are incident on the photo diode 13 arranged for monitoring the light emitting output, thereby monitoring the output of the light emitting source 1.

In FIG. 1 the light emitting source 1 comprising a semiconductor laser chip having a number of laser units is specifically described to be formed by a laser diode array (LDA); note that the light emitting source 1 emitting a number of laser beams may also be formed by independent laser diodes each individually emitting a laser beam.

Figure 2:
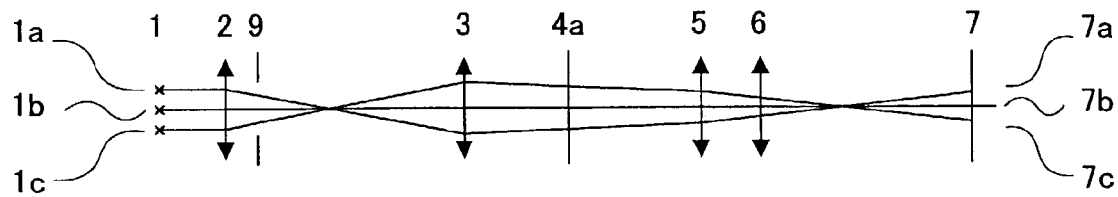
FIG. 2 is a view for explaining the optical system of the multi-beam laser scanning device of the first embodiment by schematically expanding the optical system.

FIG. 2 is a schematic view for explaining the configuration of the optical system of the multi-beam laser scanning device of the first embodiment of the present invention. Specifically, FIG. 2 shows the light paths of the laser beams, that is, the positions of the laser beams in each optical element in the sub-scanning direction.

In FIG. 2, the numerals are the reference numbers of the optical elements shown in FIG. 1, that is, the light emitting source 1, the condense lens 2, the line image formation optical system 3, the reflection and deflection surface 4a of the deflector 4, the fθ lens 5, the long sheet lens 6, the medium 7, and the diaphragm 9. In addition, symbols 1a, 1b and 1c represent three laser units of the light emitting source 1, and symbols 7a, 7b and 7c represent three image height positions on the medium 7 of the laser beams from laser units 1a, 1b, and 1c, respectively.

As shown in FIG. 2, among the laser beams emitted from the laser units 1a, 1b and 1c of the light emitting source 1, the laser beams from the laser units 1a and 1c pass through every optical element at positions deviating from the optical axis; only the laser beam from the laser unit 1b propagates along the optical axis, because the laser unit 1b is located on the optical axis.

In other words, when the laser beams from the light emitting source 1 pass through the series of optical elements successively and propagate to the medium 7, light paths of most of the laser beams are not along the optical axis, but the laser beams pass through different positions of the optical elements. Because the refractive powers at different positions of each optical element are different, the laser beams are refracted at slightly different angles while passing through an optical element, consequently causing fluctuation of image heights 7a, 7b, and 7c on the medium 7, that is, causing scanning line bending on the medium 7.

Figure 3:
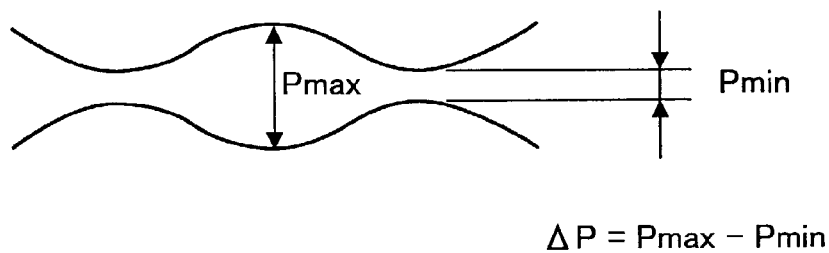
FIG. 3 is a view for explaining the scanning line bending in the multi-beam laser scanning device of the first embodiment of the present invention.

FIG. 3 shows the scanning line bending in the multi-beam laser scanning device of the first embodiment of the present invention.

Shown in FIG. 3 are two scanning lines at different image heights. Due to the reasons described above, the two scanning lines are not straight, but bend and become curves. This is the so-called "scanning line bending".

The amount of the scanning line bending is approximately proportional to the deviation of the laser beam from the optical axis of the optical elements, specifically, the scanning line bending increases, when the incident laser beam is more deviated from the optical axis.

As shown in FIG. 3, the interval between two scanning lines is represented by P, and the maximum and the minimum of the scanning line interval are denoted as Pmax and Pmin, respectively. Further, the maximum of the difference in the scanning line interval P is denoted as $\Delta P$, and $\Delta P$ can be expressed by the following equation.

$$\Delta P = P\mathrm{max} - P\mathrm{min}$$

Figure 4:
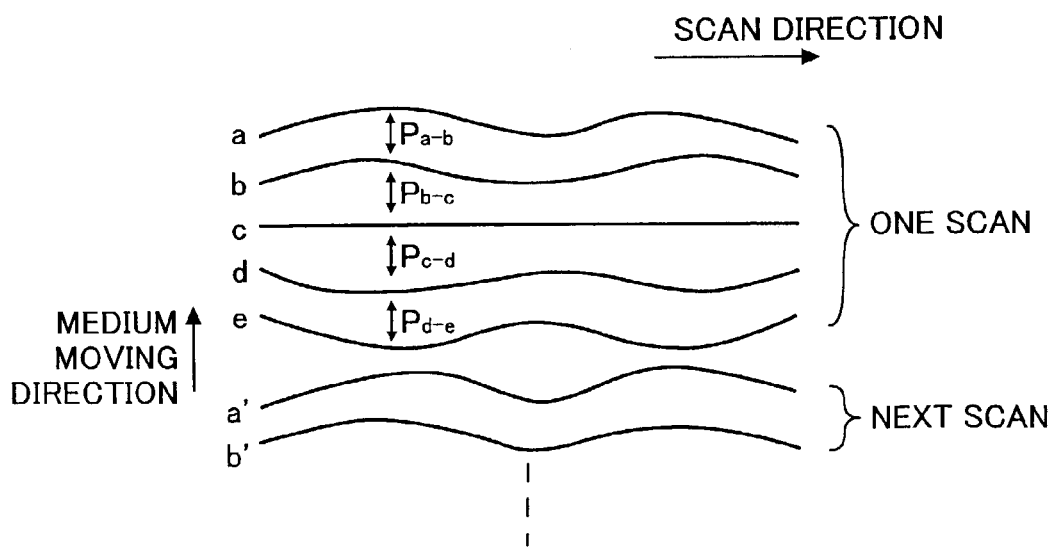
FIG. 4 is a view for explaining the scanning line bending in the multi-beam laser scanning device of the first embodiment of the present invention.

FIG. 4 is a view for further explanation of scanning line bending in the multi-beam laser scanning device of the first embodiment of the present invention.

Shown in FIG. 4 are scanning lines on the medium 7 formed in two scanning operations. Here, "one scanning" means scanning of laser beams deflected at the same time by the same surface of the deflector 4. In FIG. 4, it is assumed that five laser beams are emitted from the light emitting source 1. The five laser beams scan the medium 7 at different image height positions and form five scanning lines in one scanning operation, being indicted by a, b, c, d, and e. Symbols a', b' represent two of five scanning lines in the next scanning. In FIG. 4, the horizontal direction is the scanning direction of laser beams on the surface of the medium 7, and the vertical direction is the direction along which the medium 7 moves. As shown in FIG. 4, the scanning line intervals between scanning lines a and b, b and c, c and d, and d and e are represented by $P_{a-b}$, $P_{b-c}$, $P_{c-d}$, and $P_{d-e}$, respectively.

As described above, the amount of scanning line bending is approximately proportional to the deviation of the laser beam from the optical axis of the optical elements. In one scanning operation, that is, scanning of laser beams deflected at the same time by the same surface of the deflector 4, because the deviation of the laser beam from the optical axis of the optical elements is nearly constant, the scanning line intervals P of different scanning line pairs are nearly equal.

That is, using the symbols defined in FIG. 4, the following equation holds.

$$P_{1-2} \approx P_{2-3} \approx P_{3-4} \approx P_{4-5}$$

Further, the following equation holds.

$$\Delta P' \approx (n-1) \cdot \Delta P$$

where $\Delta P'$ represents the difference of the interval between the last scanning line 5 in one scanning operation and the first scanning line 1' in the next scanning operation (scanning caused by the next deflection reflection surface of the deflector 4), and n represents the number of scanning lines in one scanning operation, also being the number of the laser beams for scanning.

Therefore, if $\Delta P'$ is too large, it in turn results in density fluctuation in an image, causing degradation of the image quality.

In FIG. 4, it is assumed that the number of the laser beams for scanning equals five, that is, n=5. This is just an example, as the number of the laser beams n may be less than 5 or greater than 5, or any number in practical use.

Figure 5A:
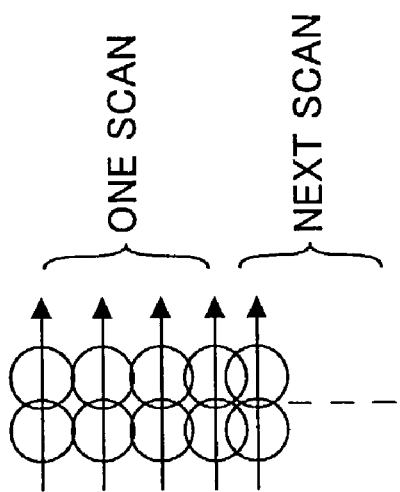
FIGS. 5A through 5C are views for detailed explanations of the scanning line bending in the multi-beam laser scanning device of the first embodiment of the present invention.
Figure 5B:
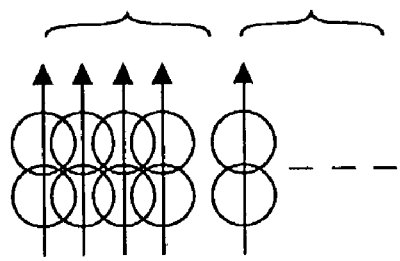
Figure 5C:
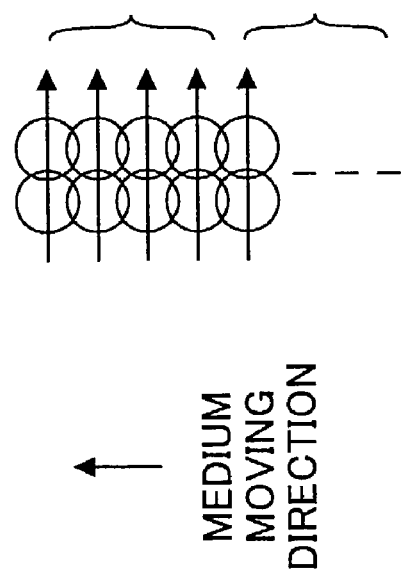

FIGS. 5A through 5C are views for detailed explanations, using n=4, of the scanning line bending in the multi-beam laser scanning device of the first embodiment of the present invention.

In FIG. 5A, the scanning line intervals are set to a specified object value in one scanning operation; in FIG. 5B, the scanning line intervals are set to be smaller than the object value in one scanning operation; in FIG. 5C, the scanning line intervals are larger than the object value in one scanning operation.

As shown in FIG. 5A, if the scanning line intervals are set appropriately, superposition of two adjacent light spots is uniform on the medium 7 not only within one scanning operation but also between two successive scanning operations. When adjacent light spots are superposed uniformly, pixel dots are formed at regular intervals on the medium 7, and images of high quality are obtainable.

If the scanning line intervals are too small, as shown in FIG. 5B, although two neighboring laser beams superpose uniformly on the medium 7 within one scanning operation, the interval is large between two successive scanning operations. In this case, in this adjacent region between the two successive scanning operations, the image density turns out to be too low or even zero, causing large density fluctuation.

Further, if the scanning line intervals are too large, as shown in FIG. 5C, similarly, although two neighboring laser beams superpose uniformly on the medium 7 within one scanning operation, the interval is too small between two successive scanning operations. In this case, in this adjacent region between the two successive scanning operations, the image density turns out to be too high, also causing large density fluctuation.

Note that FIGS. 5A through 5C are just for schematically explaining the problem concerned; the relative position relation of the light spots shown in FIGS. 5A through 5C are not necessarily practical ones.

The tolerance of the spot superposition was studied experimentally while considering the relation between dot superposition and various factors. The measurement results are summarized in the table in FIG. 6. The tolerance of the spot superposition in practical use was determined using the results in the table in FIG. 6.

Figures 6, 7:
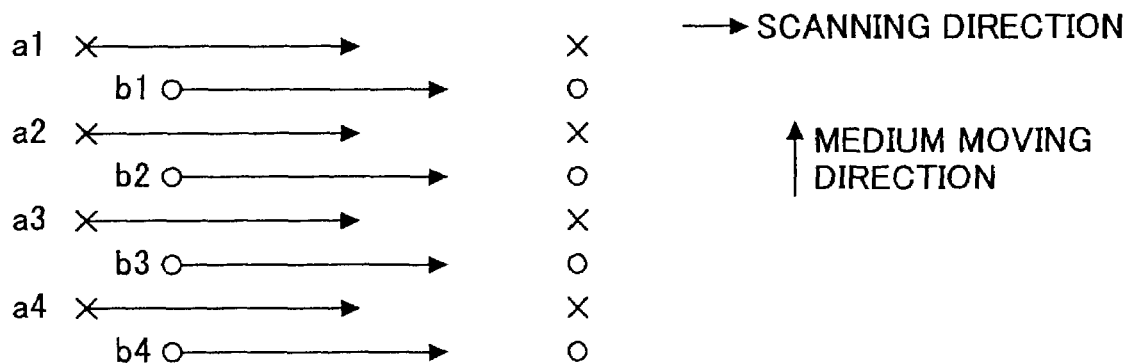
FIG. 6 is a table showing experimental measurement results for evaluating scanning line intervals in the multi-beam laser scanning device of the first embodiment of the present invention.
FIG. 7 is a view of an example of a light spot arrangement by using the light emitting source of the multi-beam laser scanning device of the first embodiment of the present invention.

Based on the above investigation and the experimental results in FIG. 6, it was found that when the following equations (1) and (2) are satisfied, the density fluctuation can be limited to an acceptable range.

$$\Delta P' < 0.8 \cdot Ps \qquad (1)$$

$$\Delta P' < 0.6 \cdot Ws \qquad (2)$$

where $\Delta P'$ represents the maximum change of the scanning line interval in the above adjacent region, Ps represents the object scanning line interval, and Ws represents the size of the beam spot in the sub-scan direction.

In addition, from the equations (1) and (2), the following equations (3) and (4) can be derived. It was also found that when the equations (3) and (4) are satisfied, the density fluctuation can also be limited to an acceptable range.

$$\Delta P < 0.8 \cdot Ps/(n-1) \qquad (3)$$

$$\Delta P < 0.6 \cdot Ws/(n-1) \qquad (4)$$

where, $\Delta P$ represents the maximum the change of the scanning line intervals in one scanning operation, and n represents the number of scanning lines in one scanning operation.

Further, from the equations (3) and (4), the following equations (5) and (6) can be derived. It is found that when the equations (5) and (6) are satisfied, the density fluctuation can also be limited to an acceptable range.

$$P\max - P\min < 0.8 \cdot Ps/(n-1) \quad (5)$$

$$P\max - P\min < 0.6 \cdot Ws/(n-1) \quad (6)$$

where Pmax represents the maximum scanning line interval in one scanning operation, and Pmin represents the minimum scanning line interval in one scanning operation.

Further, the relation Ps<Ws should be satisfied if requiring that gaps not be left between adjacent dots, so from equations (1) and (2), the following equation (7) can be derived.

$$Ps < 0.75 \cdot Ws \quad (7)$$

It was found that the acceptable range of the beam spot in the sub-scan direction Ws should be set so that the relative relation between Ws and the object scanning line interval Ps satisfies the equation (7).

Next, the detailed configuration of the light emitting source 1 in the multi-beam laser scanning device shown in FIG. 1 is described.

The configuration of the light emitting source 1 can be simplified when using a semiconductor laser array having a number of laser units.

Further, if a number of such semiconductor laser arrays are combined to form the light emitting source, it is possible to achieve high speed image formation without changing the deflecting speed of the deflector in the existing apparatus.

FIG. 7 shows light spot arrangement by using the light emitting source 1 consisting of a number of semiconductor laser arrays in the multi-beam laser scanning device according to the first embodiment of the present invention. Illustrated in FIG. 7 is a position distribution on the scanning surface of the medium 7 of the light spots of the laser beams from a number of semiconductor laser arrays (LDA).

In FIG. 7, a not shown light emitting source 1 comprises two semiconductor laser arrays each consisting of four laser units. The four laser beams from the first semiconductor laser array form four light spots a1, a2, a3, and a4 on the scanning surface of the medium 7, and the four laser beams from the second semiconductor laser array form four light spots b1, b2, b3, and b4 on the scanning surface of the medium 7. The tracks of the light spots a1, a2, a3, and a4 and light spots b1, b2, b3, and b4 are scanning lines on the medium 7.

As shown in FIG. 7, the light emitting source 1 is configured so that the light spots of the first semiconductor laser array (a1, a2, a3, and a4) and the light spots of the second semiconductor laser array (b1, b2, b3, and b4) are distributed alternately, that is, a light spot of one semiconductor laser array (a1, a2, a3, and a4, or b1, b2, b3, and b4) is in between every two neighboring light spots of the other semiconductor laser array (b1 and b2, b3 and b3, b3 and b4, or a1 and a2, a2 and a3, a3 and a4), forming a zigzag distribution.

With the light emitting source 1 having a configuration to form such a distribution of light spots, it is possible to improve the pixel density in the sub-scan direction on the scanning surface of the medium 7 without changing the focal length, image magnification, and other the structural parameters of the scanning optical system including the condensing lens 2, the line-image formation optical system 3, the fθ lens 5, and the long sheet lens 6 as shown in FIG. 1. Further, in such a configuration of the light emitting source, high pixel density is obtainable even without tilting the semiconductor laser array, so, it is possible to use the light emitting source without inclining the divergence angle of the semiconductor laser array. Certainly, in this case, it is still possible to adjust the pitch of light spots and the overall pixel density and to increase the pixel density by tilting the semiconductor laser array.

Figure 8:
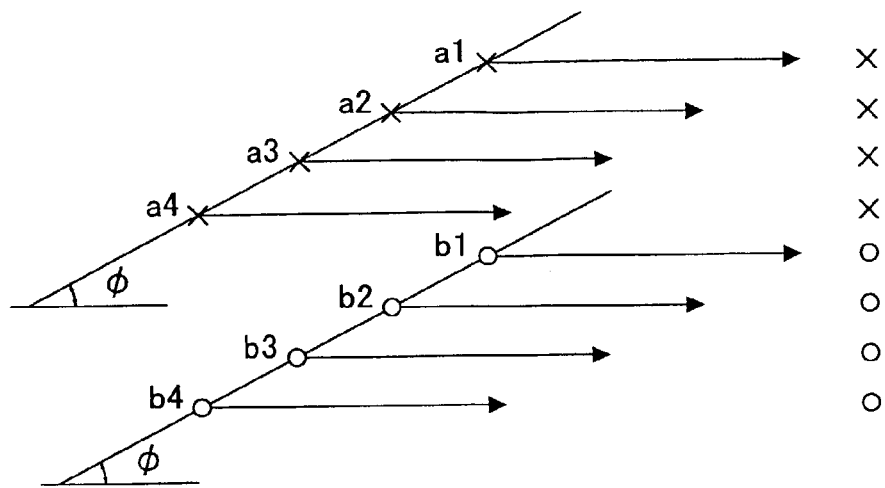
FIG. 8 is a view of another example of the light spot arrangement by using the light emitting source of the multi-beam laser scanning device of the first embodiment of the present invention.

Alternatively, the light emitting source 1 may also be configured so as to form a beam spot distribution as shown in FIG. 8.

FIG. 8 shows another example of beam spot arrangement using the light emitting source 1 consisting of a number of semiconductor laser arrays in the multi-beam laser scanning device according to the first embodiment of the present invention.

In FIG. 8, a not shown light emitting source 1 comprises two neighboring semiconductor laser arrays each consisting of four laser units. The four laser beams from the first semiconductor laser array form four light spots a1, a2, a3, and a4 on the scanning surface of the medium 7, and the four laser beams from the second semiconductor laser array form four light spots b1, b2, b3, and b4 on the scanning surface of the medium 7. The tracks of the light spots a1, a2, a3, and a4 and light spots b1, b2, b3, and b4 are scanning lines on the medium 7.

So as shown in FIG. 8, the light spots of one semiconductor laser array are alternated with those of the other semiconductor laser array.

In this case, in FIG. 8, each semiconductor laser array is inclined relative to the sub-scan direction with the light emission direction as a rotational axis to narrow the interval of the scanning lines formed by the two semiconductor laser arrays so as to increase the pixel density. The first and the second semiconductor laser arrays are inclined by angles of ψ and φ relative to the sub-scan direction, respectively.

As explained below with reference to FIGS. 9A and 9B, by changing the inclination angles ψ and φ of the semiconductor laser arrays, it is possible to freely change the pixel density in the sub-scan direction on the scanning surface of the medium 7, thereby it is possible to simply obtain higher pixel density. Further, by changing the inclination angles ψ and φ of the semiconductor laser arrays, it is also possible to adjust the non-uniformity of the pitches of the laser emitting spots of the light emitting source 1, as well as the overall pixel density.

Figure 9A:
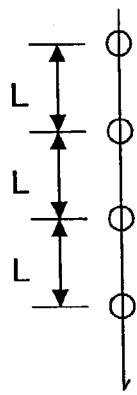
FIGS. 9A and 9B are views of two arrangements of the semiconductor laser array in the light emitting source of the multi-beam laser scanning device of the first embodiment of the present invention.
Figure 9B:
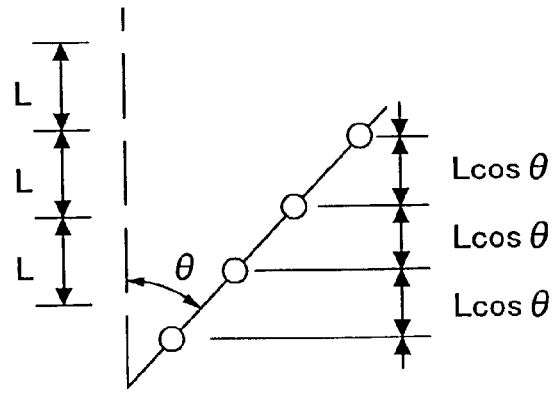

FIGS. 9A and 9B show arrangements of the semiconductor laser array in the light emitting source 1 of the multi-beam laser scanning device of the first embodiment of the present invention. Specifically, FIGS. 9A and 9B show a method of arranging the semiconductor laser arrays for adjusting the scanning line interval.

FIG. 9A shows a semiconductor laser array consisting of four laser emitting spots arranged along the sub-scan direction; FIG. 9B shows a semiconductor laser array consisting of four laser emitting spots arranged to be inclined by an angle θ relative to the sub-scan direction with the light emission direction as a rotational axis.

With the configuration of the semiconductor laser array shown in FIG. 9A, because the laser units are arranged at intervals equal to l, the scanning line interval turns out to be l; due to the inclined configuration of the semiconductor laser array shown in FIG. 9B, which is obtained by inclining the configuration in FIG. 9A, the scanning line interval turns out to be l·cos(θ), being smaller than that in FIG. 9A. Therefore, the scanning line interval can be freely changed by giving the laser array an inclination relative to the sub-scan direction at any angle, and thereby obtaining any desired pixel density.

Note that the above description is true to both the scanning method shown in FIG. 7 and the scanning method shown in FIG. 8.

Further, by making an arrangement with the angle θ adjustable, even when the scanning line interval ends up deviating from the object value due to processing uncertainties, it is possible to correct the scanning line interval to the object value by adjusting the angle θ.

Further, when adjusting the angle θ, a semiconductor laser array may be rotated individually, or the light emitting source may be rotated as a whole.

Figure 10:
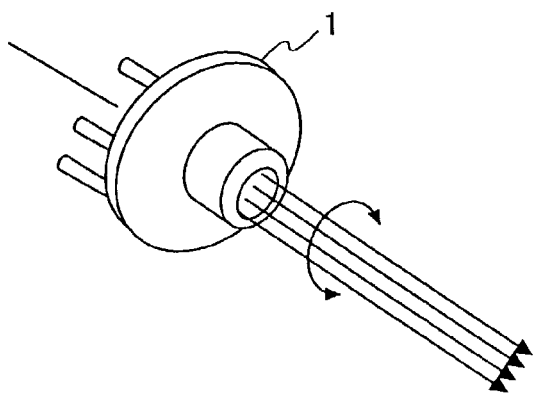
FIG. 10 is a view of a first example of the light emitting source in the multi-beam laser scanning device of the first embodiment of the present invention.

FIG. 10 is a view of a first specific example of the light emitting source 1 in the multi-beam laser scanning device of the first embodiment of the present invention.

In FIG. 10, the light emitting source 1 consists of a single semiconductor laser array, and the light emitting source 1 can be rotated as a whole.

Note that in FIG. 10 mechanisms holding the semiconductor laser array and controlling the rotation of the semiconductor laser array are not illustrated. In order to hold the semiconductor laser array and control the rotation of the semiconductor laser array, for example, the semiconductor laser array may be attached to a plate-shaped supporting member so that the semiconductor laser array can be rotated together with the supporting member, and by adjusting the rotation of the plate-shaped supporting member, the rotation of the semiconductor laser array can be adjusted.

Figure 11:
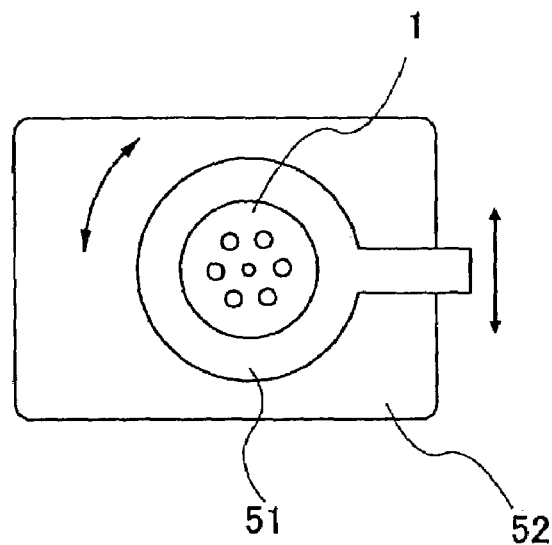
FIG. 11 is a view of a second example of the light emitting source in the multi-beam laser scanning device of the first embodiment of the present invention.

FIG. 11 is a view of a second specific example of the light emitting source in the multi-beam laser scanning device of the first embodiment of the present invention.

In FIG. 11, the light emitting source 1 comprises one semiconductor laser array. Note that In FIG. 11 the light emitting source 1 is viewed from the side opposite to the light emission side of the semiconductor laser array including a number of LDs (laser diode).

In FIG. 11, the semiconductor laser array constituting the light emitting source 1 is integrally attached to a supporting member 51; the semiconductor laser array and the supporting member 51 are mounted on a base 52, and the supporting member 51 is rotatably held by the base 52. By rotating the supporting member 52 relative to the base 52 and adjusting the rotation, it is possible to control the rotation of the semiconductor laser array.

Figure 12:
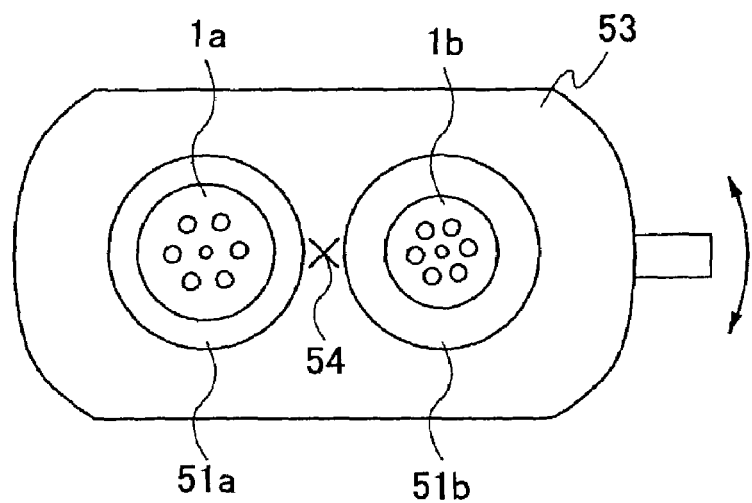
FIG. 12 is a view of a third example of the light emitting source in the multi-beam laser scanning device of the first embodiment of the present invention.

FIG. 12 is a view of a third specific example of the configuration of the light emitting source 1 in the multi-beam laser scanning device of the first embodiment of the present invention.

In FIG. 12, the light emitting source 1 comprises two semiconductor laser arrays 1a and 2b. Note that In FIG. 12 the light emitting source 1 is also viewed from the side opposite to the light emission side of the semiconductor laser arrays.

In FIG. 12, the semiconductor laser arrays 1a and 2b are integrally attached to supporting members 51a and 51b, respectively; the semiconductor laser arrays 1a and 1b and the supporting member 51a and 51b are mounted on a base 53, and the supporting member 51a and 51b are rotatably held by the base 53. The light source 1 as a whole can be rotated with respect to the rotational axis 54, and the rotation can be adjusted.

Figure 13:
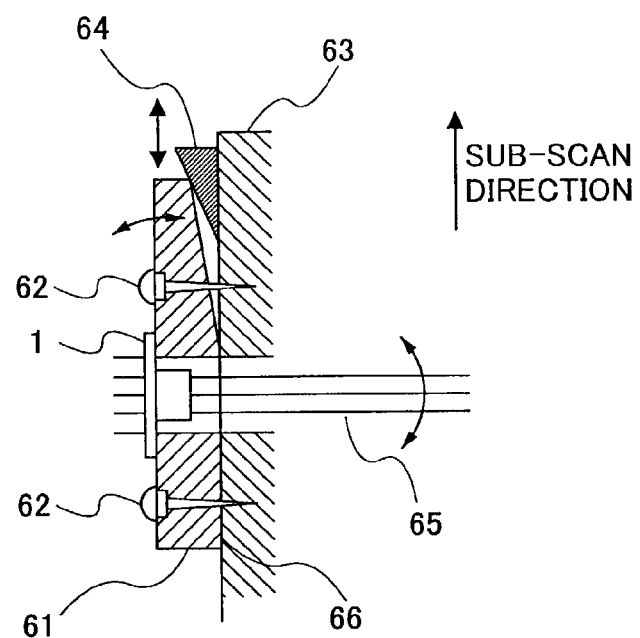
FIG. 13 is a view of a fourth example of the light emitting source in the multi-beam laser scanning device of the first embodiment of the present invention.

FIG. 13 is a view of a fourth specific example of the light emitting source in the multi-beam laser scanning device of the first embodiment of the present invention.

In FIG. 13, the light emitting source 1 is inclined relative to the scanning plane of the laser beams deflected by the deflector 4. Here, the "scanning surface" means the plane through which the laser beams pass when the laser beams are deflected by the deflector 4. So, ideally, the light emitting source 1 and the laser beams emitted from the light emitting source 1 should be located in the scanning plane.

As shown in FIG. 4, the scanning line bending increases, when the laser beams pass optical elements at positions farther deviating from the optical axis of the optical elements. If the laser beams from light emitting source 1 are inclined relative to the scanning plane due to all kinds of mounting errors, the laser beams enter the subsequent optical elements while being inclined. Due to this, the positions at which the laser beams pass optical elements deviate from the optical axis of the optical elements, and the scanning line bending increases; consequently, the fluctuation of the scanning line intervals increases. In order to correct this deviation, an adjusting device is provided to tilt the light emitting source 1 in the configuration shown in FIG. 13.

In the configuration shown in FIG. 13, a wedge 64 is interposed between the supporting member 61 that holds the light emitting source 1 and the base 63. By adjusting the interposition length of wedge 64, it is possible to adjust the emitting direction of the laser beams 65 from the light emitting source 1. When the fluctuation of the scanning line intervals on the scanning surface of the medium 7 is reduced to a predetermined sufficiently low level, the supporting member 61 and the base 63 can be fixed with screws 62. Further, in FIG. 13, the device is mounted to be rotatable with the end 66 of the supporting member 61 as a rotational axis, so it is possible to adjust the rotation condition of the light emitting source 1.

The Second Embodiment

Figure 14:
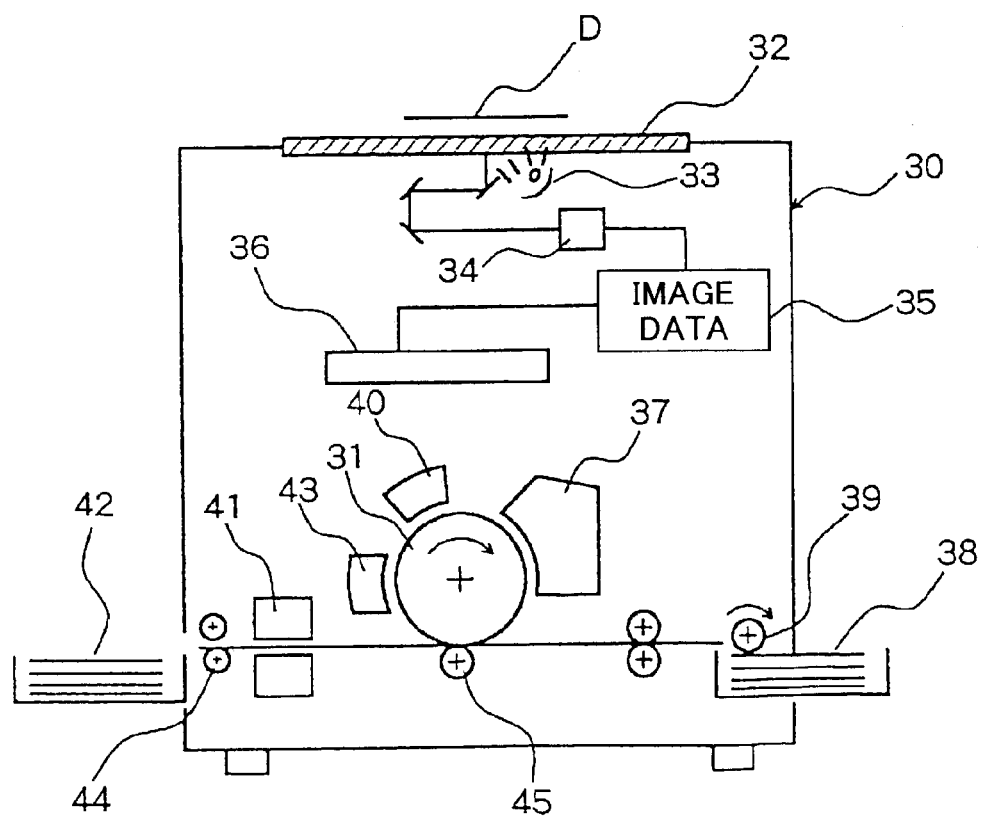
FIG. 14 is a schematic sectional view of a configuration of an image forming apparatus according to a second embodiment of the present invention.

FIG. 14 is a schematic cross-sectional view of a configuration of an image forming apparatus according to a second embodiment of the present invention. In this image forming apparatus, a multi-beam laser scanning device is installed.

The image forming apparatus 30 shown in FIG. 14 is comprised of a photo conductor drum 31, a contact glass 32, a lamp 33, a scanner lens block 34, an image data processor 35, a writing optical unit 36, a developer 37, a paper feeder tray 38, a paper feeding roller 39, a charger 40, a fuser 41, a paper delivery tray 42, a discharge cleaner 43, a paper outputting roller 44, and a transfer roller 45.

In the image forming apparatus 30, a manuscript D is placed on the contact glass 32, and is irradiated by the lamp 33. The light is reflected by a number of mirrors and is guided to the scanner lens block 34. A not shown CCD (charge coupled device) captures the image on the manuscript D, and sends the image data to the image data processor 35. The image data are processed in the image data processor 35 and are sent to the writing optical unit 36 including the above multi-beam laser scanning device. Based on the image signals, the writing optical unit 36 repeatedly turns ON and turns OFF the light emitting source formed from semiconductor lasers, and scans the spots of the laser beams on the photo conductor drum 31. By scanning with the laser beams, latent images are formed on the surface of the photo conductor drum 31, which is charged in advance by the charger 40, and the latent images are developed to visible images by the developer 37. On the other hand, pieces of paper are transported from the paper tray 38 to the photo conductor drum 31 by the paper feeding roller 39, and images are transferred to the pieces of paper by the transfer roller 45. After the image is fused by he fuser 41, the paper is delivered to the paper delivery tray 42 by the delivery roller 44. Then, the photo conductor drum 31 is discharged and cleaned by the discharge cleaner 43, and is charged again by the charger 40, and the steps are subsequently repeated.

In this way, by installing the multi-beam laser scanning device of the present invention in the image forming apparatus, it is possible to provide an image forming apparatus able to limit the density fluctuation within an acceptable range.

According to the above configuration, with the multi-beam laser scanning device in which a number of laser beams scan the photo conductor 31 at the same time, in the adjacent region between the two successive scanning operations, the fluctuation of the scanning line intervals (image height fluctuation) is appropriately suppressed, therefore, the density fluctuation in an image can be suppressed to an acceptable range so that it is not visible to users. In addition, by scanning a number of laser beams at the same time, it is possible to reduce the number of revolutions of the deflector 4 as shown in FIG. 1, thereby reducing the power consumption for driving the rotation of the deflector 4, and reducing the heat generation, and further, reducing the noise caused by the rotational movement.

With the multi-beam laser scanning device in which a number of laser beams scan the photo conductor 31 at the same time, it is possible to is appropriately suppress the fluctuation of the interval of scanning lines generated by laser beams deflected by any deflecting reflecting surface, therefore, the density fluctuation in an image can be suppressed to an acceptable range so that it is not visible to users.

By setting the beam spot size in the sub-scan direction to an appropriate range relative to the object scanning line interval, it is possible to suppress the density fluctuation in an image to an acceptable range. In addition, it is possible to increase the pixel density in the sub-scan direction without changing the configuration of the existing optical system.

The scanning line interval can be freely changed, particularly, it can be adjusted to the object value.

The incident angle of laser beams to the scanning optical system can be corrected, thereby reducing the scanning line bending, as well as the fluctuation of the scanning line interval.

The light emitting source 1 may be configured to include a plurality of semiconductor laser arrays, so it is possible to scan a multiple number of laser beams at the same time compared with the case of a single semiconductor laser array, further it is possible to achieve high speed image formation without changing the deflecting speed of the deflector 4. By combining a plurality of semiconductor laser arrays, higher pixel density is achievable.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, according to the present invention, it is possible to provide a multi-beam laser scanning device and an image forming apparatus able to efficiently suppress and prevent density fluctuation caused by scanning line bending and achieve higher image quality.

When at least one of equations (1) and (2), or at least one of equations (3) and (4), or equation (5) is satisfied, the scanning line interval can be adjusted appropriately to obtain appropriate superposition of neighboring light spots and suppress density fluctuation to an acceptable range, as a result, higher image quality is achievable.

According to the present invention, it is possible to provide a multi-beam laser scanning device having a simple configuration but able to adjust the scanning line interval, the emission direction of laser beams from a light emitting source to suppress density fluctuation, and increase the pixel density.

By setting the light spot size in the second direction (the sub-scan direction) to an appropriate range relative to an object value of the scanning line interval, it is possible to suppress the density fluctuation in an image to an acceptable range. Furthermore, it is possible to increase the pixel density in the sub-scan direction without changing the configuration of the existing optical system.

In addition, the scanning line interval can be freely changed by adjusting the inclination of the arrangement of the laser units, particularly, the scanning line interval can be adjusted to the object value so as to suppress the scanning line fluctuation to the minimum.

In addition, the incident angle of laser beams can be corrected, thereby it is possible to suppress the scanning line bending, as well as the fluctuation of the scanning line interval.

The light emitting source includes a semiconductor laser array, or even a plurality of semiconductor laser arrays to generate a number of laser beams, so it is possible to increase image formation speed and pixel density without changing the deflecting speed of the deflector.

This patent application is based on Japanese priority patent application No. 2002-162468 filed on Jun. 4, 2002, the entire contents of which are hereby incorporated by reference.

What is claimed is:

1. A multi-beam laser scanning device, comprising:
   a light emitting source that generates at least three laser beams;
   a rotating deflector that has a plurality of deflecting surfaces, the rotating deflector, while rotating, deflecting the laser beams at each of the deflecting surfaces to make the laser beams scan in a first direction; and
   a scanning surface on which at least three light spots of the laser beams deflected by the rotating deflector are formed along a second direction, the light spots moving in the first direction and forming at least three scanning lines,
   wherein
   a first group of at least three scanning lines generated by deflection on a first deflecting surface of the rotating deflector are located along the second direction adjacent to a second group of at least three scanning lines generated by deflection on a second deflecting surface next to the first deflecting surface, said first group of at least three scanning lines not interlaced with said second group of at least three scanning lines; and
   an interval between a scanning line X of the first group and a scanning line Y of the second group, the scanning line X and the scanning line Y being adjacent to one another, satisfies the following equation:

$\Delta P' < 0.6 \cdot Ws$ where $\Delta P'$ represents a difference between a maximum interval and a minimum interval between the scanning line X and the scanning line Y, and Ws represents a size of one of the light spots in the second direction.

2. A multi-beam laser scanning device as claimed in claim 1,
wherein
the target interval between two neighboring scanning lines among the scanning lines satisfies the following equation:

$Ps < 0.75 \cdot Ws,$ wherein Ps represents a target interval of two neighboring scanning lines in the first group of scanning lines or in the second group of scanning lines, said target interval being determined by a target density of the scanning lines in the second direction.

3. The multi-beam laser scanning device as claimed in claim 1, wherein the light emitting source comprises a semiconductor laser array including a plurality of laser units, the laser units being arranged to be inclined relative to a normal line to a scanning plane formed by the laser beams deflected by the rotating deflector.

4. The multi-beam laser scanning device as claimed in claim 1, wherein the light emitting source comprises a semiconductor laser array including a plurality of laser units, the light emitting source as a whole being arranged to be rotatable with respect to a rotational axis in parallel with a laser emission direction of the light emitting source.

5. The multi-beam laser scanning device as claimed in claim 1, wherein the light emitting source further comprises a rotation adjustment unit configured to adjust the rotation of the light emitting source with respect to a rotational axis in parallel with a scanning plane formed by the laser beams deflected by the rotating deflector.

6. The multi-beam laser scanning device as claimed in claim 1, wherein
the light emitting source comprises a plurality of semiconductor laser arrays each including at least one laser unit; and
light spots on the scanning surface related to different semiconductor laser arrays are alternately arranged.

7. The multi-beam laser scanning device as claimed in claim 6, wherein light spots on the scanning surface formed by the laser units of each semiconductor laser array are arranged along a straight line.

8. An image forming apparatus, comprising:
a light emitting source that generates at least three laser beams;
a rotating deflector that has a plurality of deflecting surfaces, the rotating deflector, while rotating, deflecting the at least three laser beams at each of the deflecting surfaces to make the laser beams scan in a first direction; and
a photoconductor having a scanning surface on which at least three light spots of the laser beams deflected by the rotating deflector are formed along a second direction, the light spots moving in the first direction and forming at least three scanning lines,
wherein
a first group of at least three scanning lines generated by deflection on a first deflecting surface of the rotating deflector are located along the second direction adjacent to a second group of at least three scanning lines generated by deflection on a second deflecting surface next to the first deflecting surface, said first group of at least three scanning lines not interlaced with said second group of at least three scanning lines; and
an interval between a scanning line X of the first group and a scanning line Y of the second group, the scanning line X and the scanning line Y being adjacent to one another, satisfies of the following equation:

$\Delta P' < 0.6 \cdot Ws$ where $\Delta P'$ represents a difference between a maximum interval and a minimum interval between the scanning line X and the scanning line Y, and Ws represents a size of one of the light spots in the second direction.

* * * * *